(12) United States Patent
Wheeler et al.

(10) Patent No.: US 10,358,857 B2
(45) Date of Patent: *Jul. 23, 2019

(54) VEHICLE FRONT DOOR POWER OPENING SYSTEM

(71) Applicant: Tesla, Inc., Palo Alto, CA (US)

(72) Inventors: David Wheeler, Pleasanton, CA (US); Chris McCarthy, Tracy, CA (US); Jacob Warman, San Francisco, CA (US); Austin Newman, San Jose, CA (US); John Hughes, San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,877

(22) Filed: Oct. 19, 2017

(65) Prior Publication Data

US 2018/0038148 A1 Feb. 8, 2018

Related U.S. Application Data

(63) Continuation of application No. 14/851,274, filed on Sep. 11, 2015, now Pat. No. 9,797,181.

(Continued)

(51) Int. Cl.
*E05F 15/63* (2015.01)
*E05F 15/616* (2015.01)
(Continued)

(52) U.S. Cl.
CPC .............. *E05F 15/616* (2015.01); *B60J 5/047* (2013.01); *B60R 16/037* (2013.01); *E05F 15/63* (2015.01);
(Continued)

(58) Field of Classification Search
CPC ......... E05F 15/616; E05F 15/63; E05F 15/77; B60J 5/047; B60J 5/04; B60R 16/037;
(Continued)

(56) References Cited

U.S. PATENT DOCUMENTS 4,183,177 A   1/1980 Kurdziel
5,067,277 A * 11/1991 Magalotti ............. F16F 9/0263
                                                  188/300

(Continued)

FOREIGN PATENT DOCUMENTS

DE   102012019299   8/2013
JP      S6291312    4/1987
(Continued)

OTHER PUBLICATIONS

International Searching Authority; International Search Report and Written Opinion; International Application No. PCT/US2016/046356; dated Jan. 10, 2017; 15 pgs.

(Continued)

*Primary Examiner* — Gertrude Arthur Jeanglaude
(74) *Attorney, Agent, or Firm* — Garlick & Markison; Bruce Garlick

(57) ABSTRACT

A system for a vehicle includes: a door; an electric actuating motor that opens and closes the door, the electric actuating motor configured for actuating at a hinge of the door; a push-open actuator mounted at a rear of the door, the push-open actuator configured for pushing against a body of the vehicle; and a wireless device configured for communications to the vehicle. A system for a vehicle includes: a front door; a rear door behind the front door, the rear door having a dual-hinge design that opens and closes in a substantially vertical direction; an electric actuating motor that opens and closes the front door, the electric actuating motor configured for actuating at a hinge of the front door;

(Continued)

and a wireless device configured for communications to the vehicle.

20 Claims, 14 Drawing Sheets

Related U.S. Application Data

(60) Provisional application No. 62/210,396, filed on Aug. 26, 2015.

(51) Int. Cl.
  E05F 15/77 (2015.01)
  B60J 5/04 (2006.01)
  B60R 16/037 (2006.01)

(52) U.S. Cl.
  CPC ............... *E05F 15/77* (2015.01); *B60J 5/04* (2013.01); *E05Y 2201/434* (2013.01); *E05Y 2201/624* (2013.01); *E05Y 2400/40* (2013.01); *E05Y 2400/85* (2013.01); *E05Y 2400/86* (2013.01); *E05Y 2600/46* (2013.01); *E05Y 2900/531* (2013.01)

(58) Field of Classification Search
  CPC ......... E05Y 2201/434; E05Y 2201/624; E05Y 2400/85; E05Y 2400/86; E05Y 2600/46; E05Y 2900/531
  USPC ........................................................ 701/49
  See application file for complete search history.

(56) References Cited

U.S. PATENT DOCUMENTS

| | | | |
|---|---|---|---|
| 5,369,911 A | 12/1994 | Fortunato | |
| 6,396,395 B1 | 5/2002 | Zielinski et al. | |
| 8,449,015 B2 | 5/2013 | Brown | |
| 8,725,330 B2 | 5/2014 | Failing | |
| 9,045,025 B1 | 6/2015 | Greene et al. | |
| 9,797,181 B2 * | 10/2017 | Wheeler | B60R 16/037 |
| 2004/0124662 A1 | 7/2004 | Cleland | |
| 2004/0187263 A1 | 9/2004 | Hoffman | |
| 2008/0296926 A1 | 12/2008 | Hanzel | |
| 2009/0007489 A1 | 1/2009 | Kern et al. | |
| 2009/0160211 A1 | 6/2009 | Krishnan et al. | |
| 2012/0016550 A1 | 1/2012 | Oakley et al. | |
| 2012/0180391 A1 | 7/2012 | McKee et al. | |
| 2013/0008088 A1 | 1/2013 | Freymann | |
| 2013/0031747 A1 | 2/2013 | Gobart | |
| 2013/0097940 A1 | 4/2013 | Brown | |
| 2015/0059250 A1 | 3/2015 | Miu et al. | |
| 2015/0264031 A1 | 9/2015 | Liu et al. | |

FOREIGN PATENT DOCUMENTS

| | | |
|---|---|---|
| JP | 2000158947 A | 6/2000 |
| JP | 2003206675 A | 7/2003 |
| JP | 2004338587 A | 12/2004 |
| JP | 2007-162459 A | 6/2007 |
| JP | 2007138540 A | 6/2007 |
| JP | 2008002085 A | 1/2008 |
| JP | 2010-196377 A | 9/2010 |
| JP | 2015059296 A | 3/2015 |
| KR | 20060070980 A | 6/2006 |
| WO | 2015074020 A1 | 5/2015 |

OTHER PUBLICATIONS 5 cool Rolls-Royce design details, as illustrated by the 2014 Wraith Coupe, Car and Driver blog, available at /, Jun. 3, 2014, 9 pages.
European Patent Office; Supplementary Partial European Search Report; Application No. EP16839799; dated Mar. 28, 2019, 10 pages.

* cited by examiner

VEHICLE FRONT DOOR POWER OPENING SYSTEM

CROSS-REFERENCE TO RELATED APPLICATION

The present U.S. Utility patent application claims priority pursuant to 35 U.S.C. § 120 as a continuation of U.S. Utility application Ser. No. 14/851,274, entitled "VEHICLE FRONT DOOR POWER OPENING SYSTEM," filed Sep. 11, 2015, schedule to issue as U.S. Pat. No. 9,797,181, on Oct. 24, 2017, which claims priority pursuant to 35 U.S.C. § 119(e) to U.S. Provisional Application No. 62/210,396, entitled "VEHICLE FRONT DOOR POWER OPENING SYSTEM," filed Aug. 26, 2015, both of which are hereby incorporated herein by reference in their entirety and made part of the present U.S. Utility patent application for all purposes.

BACKGROUND

Vehicles continue to be virtually indispensable tools of daily use for many people around the world. Commuting to and from work, school, and various appointments is often done by vehicle if no other form of transportation is a preferable alternative. Moreover, the vehicle is very useful for transporting personal belongings when traveling for shorter or longer distances. For example, many people bring with them a handbag, purse, cell phone, tablet, or a bag or other accessory for most of their day. These items make it more difficult to maneuver car handles for getting into and out of vehicles.

DETAILED DESCRIPTION

This document describes examples of systems and techniques for providing a powered opening and closing of a front door of a vehicle. In some implementations, a touchless entry into the vehicle can be provided. This allows a person to easily enter the vehicle, for instance while carrying items in both hands. In such and other situations, a self-opening and self-closing door provides a convenient way of entering the vehicle, where the items can then be set down before the person drives off.

Figure 1:
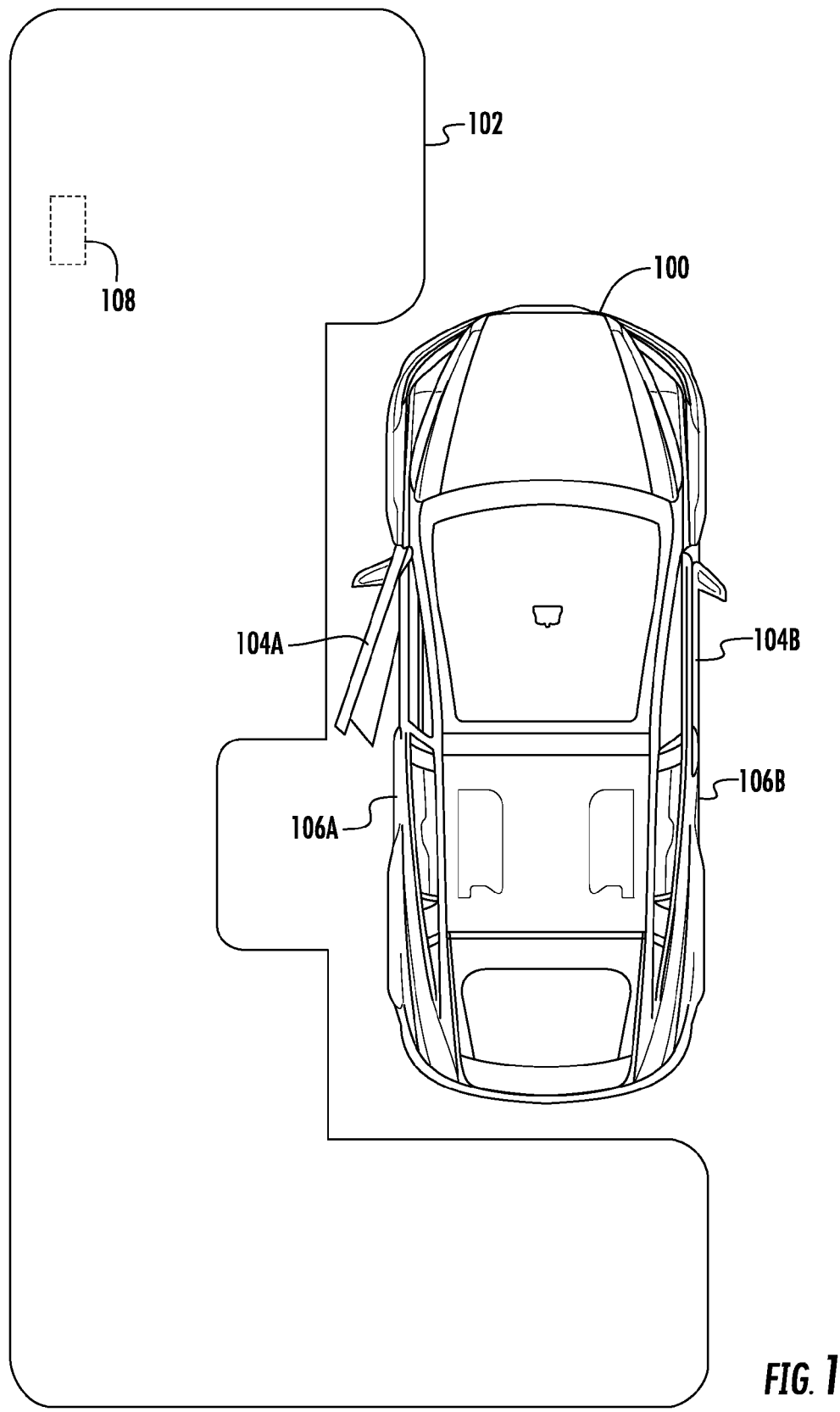
FIG. 1 shows a top view of an example of a vehicle and a detection zone.

FIG. 1 shows a top view of an example of a vehicle 100 and a detection zone 102. The vehicle is here a passenger vehicle of crossover type, but in other implementations can be any type of vehicle where the driver seat is enclosed behind a door or other closure that must be opened for entry and closed before driving. The vehicle can have different numbers of doors depending on the type and model. Here, the vehicle has front doors 104A-B, and rear doors 106A-B. The driver seat can be on the left side or the right side of the vehicle depending on the country it is designed for. Here, the driver seat is on the left side, so the front door 104A can also be referred to as the driver seat door.

The vehicle defines the detection zone 102 according to one or more predefined patterns. Here, the zone is dedicated to the driver seat door. In some implementations, this zone is defined for the purpose of automatically opening the front door 104A to a convenience position under certain circumstances. For example, when the vehicle detects that the driver is within the zone 102, the vehicle can automatically open the door 104A to approximately the angle illustrated. The convenience position can be defined as opening the door to any suitable angle. Solely as an example, this angle can be in a range of about 15-25 degrees from the closed position.

Opening the door to the convenience position can be done while the driver is approximately a few steps away from the driver seat door, as indicated by the exemplary pattern of the detection zone. This can give the driver an intuitive early indication that this vehicle has an automated power opening front door. However, in this example the door is only partially open in the convenience position so that there is not a significant chance that the door comes too close to another person such as a passenger or a passing bicyclist. In some implementations, one or more obstruction detectors (e.g., ultrasonic sensors) are positioned on the side of the vehicle. For example, sensors can detect the presence and distance of obstacles near the front door, and transmit that information back to a door controller. If so, the automated opening can be inhibited or the sequence can be modified accordingly (e.g., by reducing the angle and/or delaying the opening).

The vehicle can detect driver presence using any suitable technique. In some implementations, the driver carries a wireless device 108 with him or her. In this description, the person carrying the wireless device is often referred to as the driver, because to the vehicle's system the presence of the wireless device signifies that this person is the driver. However, the vehicle behavior is the same also if the wireless device is carried by a person who does not intend to drive the vehicle. The wireless device can transmit one or more types of wireless signals that are received and recognized by the vehicle. For example, the device can be a key fob designed to operate in conjunction with this particular type and model of vehicle. As another example, the wireless device is a smartphone, tablet, smart watch, or any other type of portable or wearable digital device. Such device is capable of executing an application designed for this particular type and model of vehicle, and the device can then interact with the vehicle by way of wireless signals or other forms of communication. As yet another example, the wireless device can be a passive circuit that can be triggered by a polling signal from the vehicle, and if so can generate a signal indicating its presence. Here, the vehicle has detected the presence of the wireless device 108 and has therefore opened the door 104A to the convenience position. In some implementations, a button on the wireless device can be pressed to trigger the door opening or closing.

During the automated opening to the convenience position, the driver can override the system in one or more ways. First, if the driver blocks the door from moving or otherwise impedes it, the motor will interrupt the opening and hold the door in place with a brake. Second, if the driver instead pushes on the door towards the open position during the automated opening, this also causes the system to interrupt the opening. This time, however, the system will not engage the brake, so that the person can freely move the door to any open position (or close it). When the person stops moving the door, the system will hold the door in place using a calculated torque value.

Figure 2:
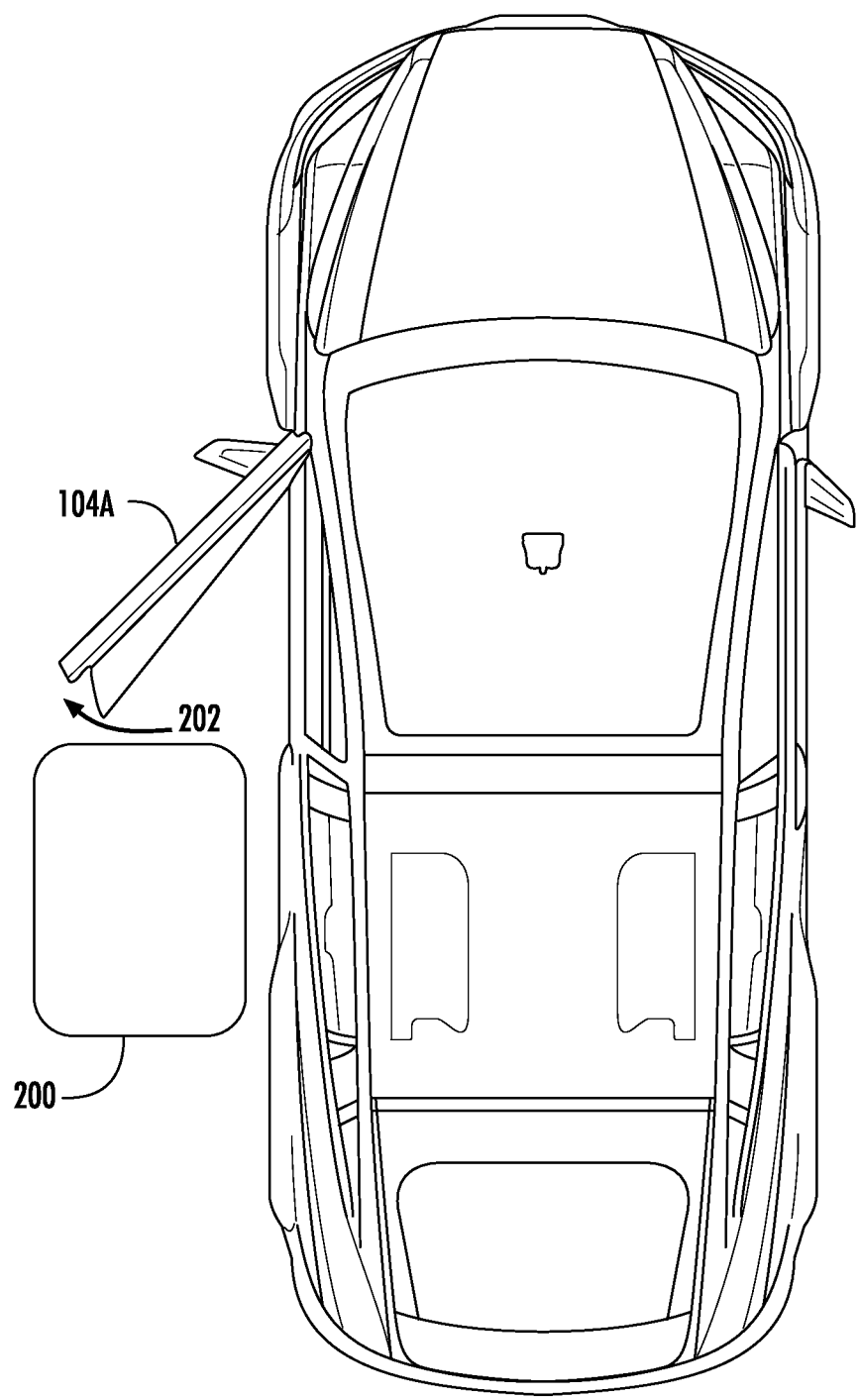
FIG. 2 shows an example of another detection zone and the front door being opened to a wide position.

FIG. 2 shows an example of another detection zone 200 and the front door 104A being opened to a wide position 202. In some implementations, the vehicle opens the door to the wide position upon detecting that the driver has come sufficiently close to the partially open front door. For example, the zone 200 corresponds to the area where the driver will likely walk if he or she intends to enter the driver seat, as opposed to, say, just walk past the vehicle or head for the trunk or rear liftgate. Moreover, the fact that someone (here, the driver) is within the zone 200 signals that there is likely not also another obstruction in front of the door 104A, such as a person walking past the vehicle.

The zone 200 can be defined using one or more detectors or sensors. For example, when the wireless signals indicate that the wireless device is near the left side of the vehicle, and the ultrasonic sensors are triggered for an object within the zone 200, then the vehicle system can conclude that the driver has entered the zone 200.

When the vehicle detects that the driver is within the zone 200, the vehicle can automatically open the door 104A to approximately the illustrated wide position 202. That is, the wide position involves opening the door further (to a wider angle) than the convenience position exemplified above. The wide position can be defined as opening the door to any suitable angle. Solely as an example, this angle can be in a range of about 40-50 degrees from the closed position. The angle of the wide position can be selected to open the door sufficiently for the driver to enter the driver seat. In some implementations, the automated opening of the front door is only available if the adjacent rear door is closed. Otherwise, the user can manually open the front door.

On the other hand, when the door has been opened to the convenience position and the driver does not enter the zone 200, then the vehicle can automatically close the door 104A. For example, this closing can occur after a predefined timeout period.

Figure 3:
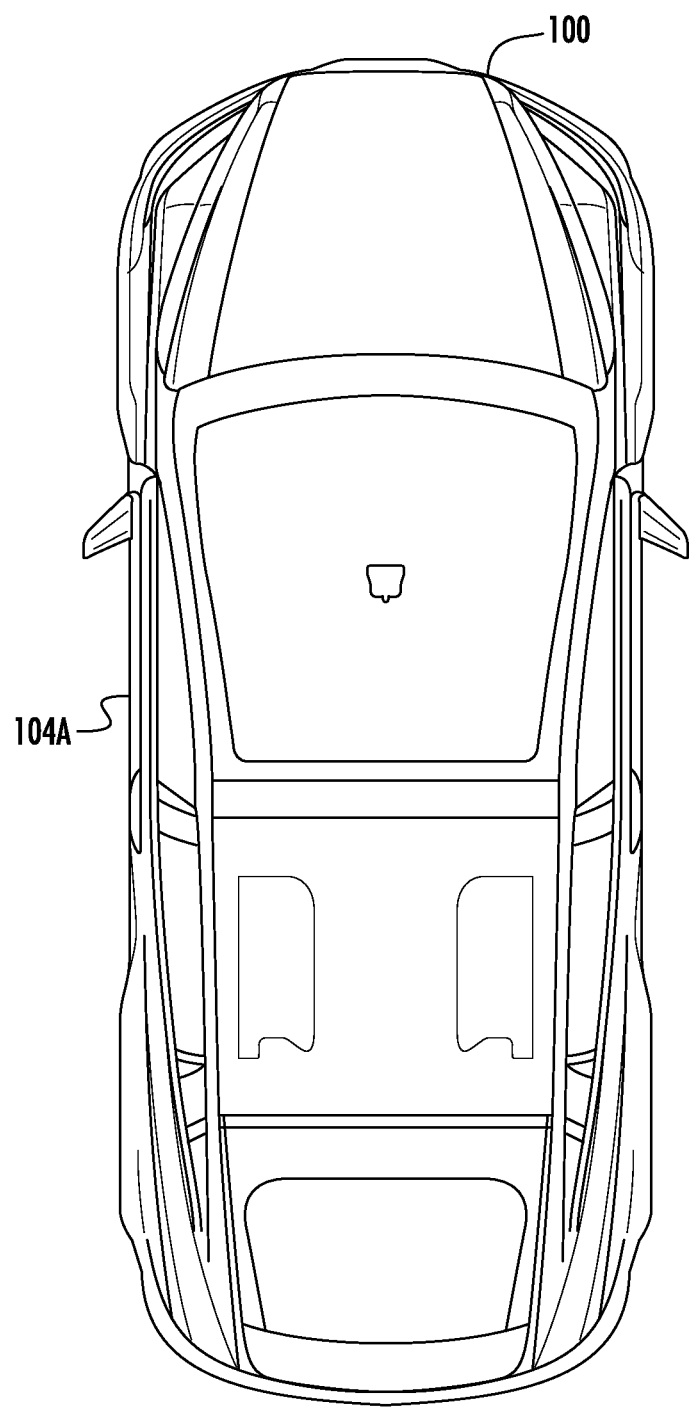
FIG. 3 shows the vehicle with doors closed.

FIG. 3 shows the vehicle 100 with doors closed. That is, in this example it is assumed that the driver enters the driver seat after the door is opened to the wide position. Upon the driver entering the seat, one or more signals can indicate to the vehicle system that the driver is fully inside the vehicle and that it is time to close the door. Particularly, one such signal is that the wireless device that was detected at the beginning of the sequence is now inside the vehicle. In some implementations, the driver steps on the brake pedal as an indication that he or she is ready to have the front door be closed. For example, in an electric vehicle this can at the same time serve as a trigger to get the vehicle ready for driving (e.g., by turning on the drive rail of the vehicle's electric system). In other implementations, one or more detectors can instead or also be used to verify whether the driver has completely entered the driver seat. Based on the received signal(s), the vehicle closes the door 104A and the driver can now drive off in the vehicle. That is, in this example the driver walked up to the vehicle and had the door automatically open for him or her, sat down in the driver seat and had the door automatically close again, all without touching a door handle or any other part of the door, and without operating any keyfob or other device.

The driver can also have the option of manually closing the front door. The door power system can recognize that the person is manually moving the door and therefore allow free movement. For example, this involves releasing a brake on the motor.

The door 104B (FIG. 1)—that is, the front passenger side door—can have a similar or identical system as the driver seat door. In some implementations, the operation can be different. First, no dedicated wireless device may exist for the passenger side door. Rather, that door can have a device for manually triggering the automated opening. Second, the automated opening may bring the passenger door to a convenience position, and from there the passenger can manually open the door to the desired angle. For example, the door system can have a brake function that automatically disengages the brake when it senses the person pulling or pushing the door, and that automatically engages when the pulling or pushing stops.

Figure 4:
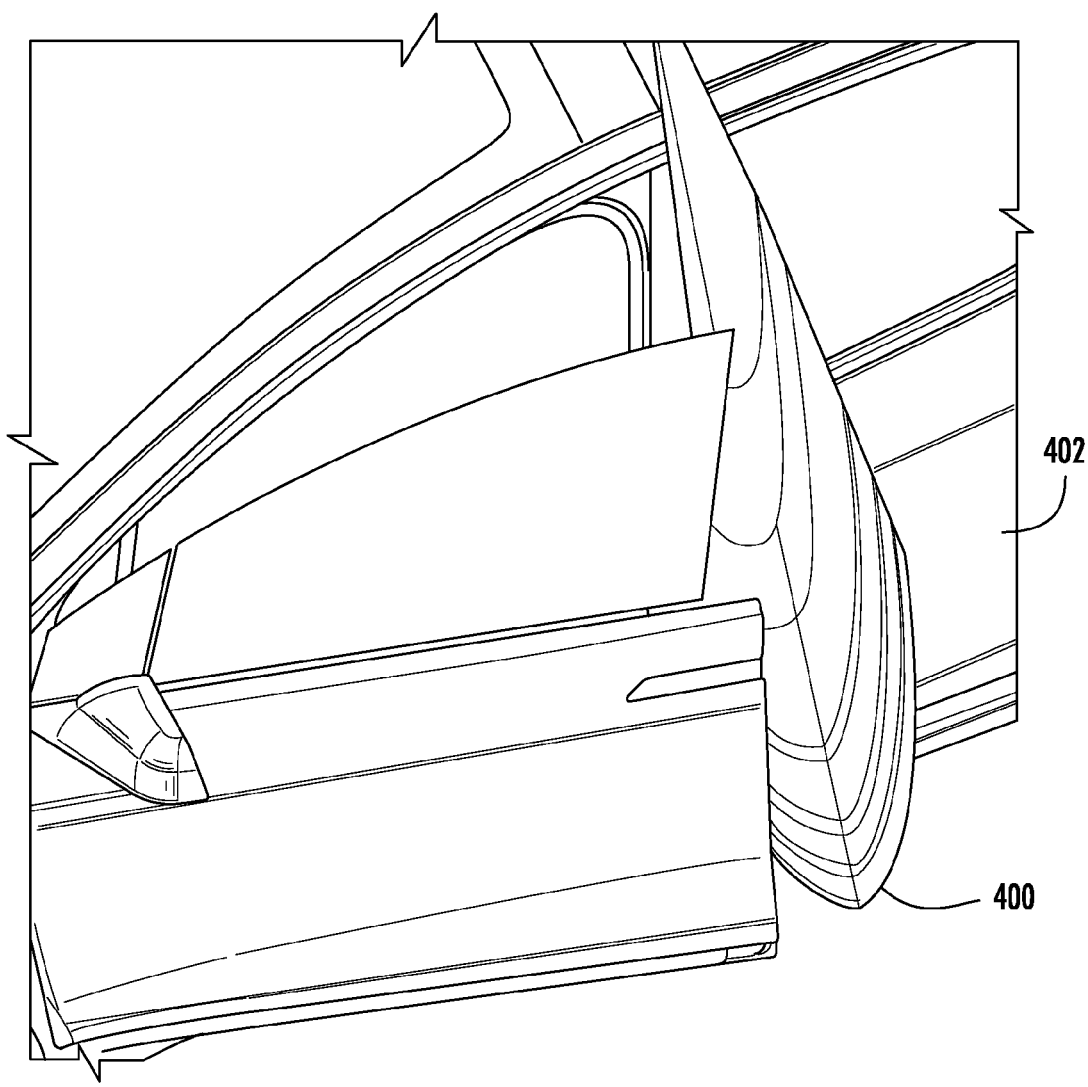
FIG. 4 shows an example of a swing pattern for a rear door.

FIG. 4 shows an example of a swing pattern 400 for a rear door 402. Here, the rear door is of the dual-hinge type that automatically opens and closes in substantially vertical directions rather than sideways. For example, any or all structures described in the following U.S. patents can be used: U.S. Pat. Nos. 8,449,015; 8,511,738; 8,511,739; and/or D678,154, the contents of each of which are incorporated herein by reference.

The swing pattern 400 indicates where portions of the rear door are located during the respective opening and closing sequences. In implementations where the edges of the front and rear doors come close to each other during opening or closing, care must be taken so as to not risk pinching a person's hand or other body part between them. For example, the angle of the convenience position for the front door can be selected so as to allow the user to grab the rear edge of the front door and have sufficient clearance to the swing pattern of the rear door.

In implementations where the rear door is not of the dual hinge type, such as with a sliding door or one having hinges at the front or rear edges thereof, a corresponding swing pattern can be defined and taken into consideration. For example, one can determine the minimum angle that the front door should be opened to, in order to avoid possible pinching regardless of the position of the rear door. The convenience position can then be specified as this or a higher value.

Figure 5:
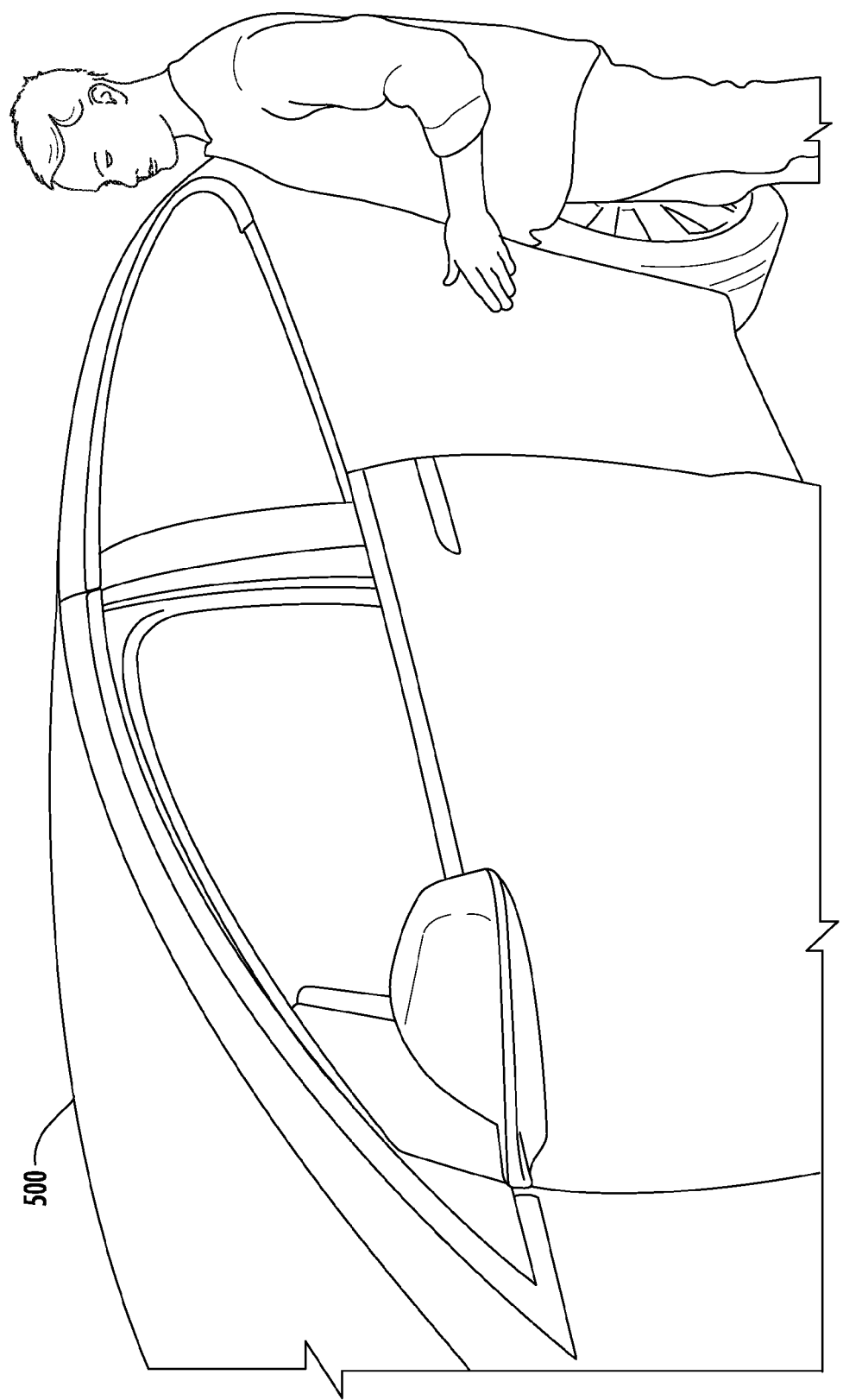
FIG. 5 shows a perspective view of an example of a person approaching a vehicle.

FIG. 5 shows a perspective view of an example of a person approaching a vehicle 500. This person is carrying a wireless device for this vehicle, and the front door has therefore been opened to a convenience position (e.g., as shown in FIG. 1).

Figure 6:
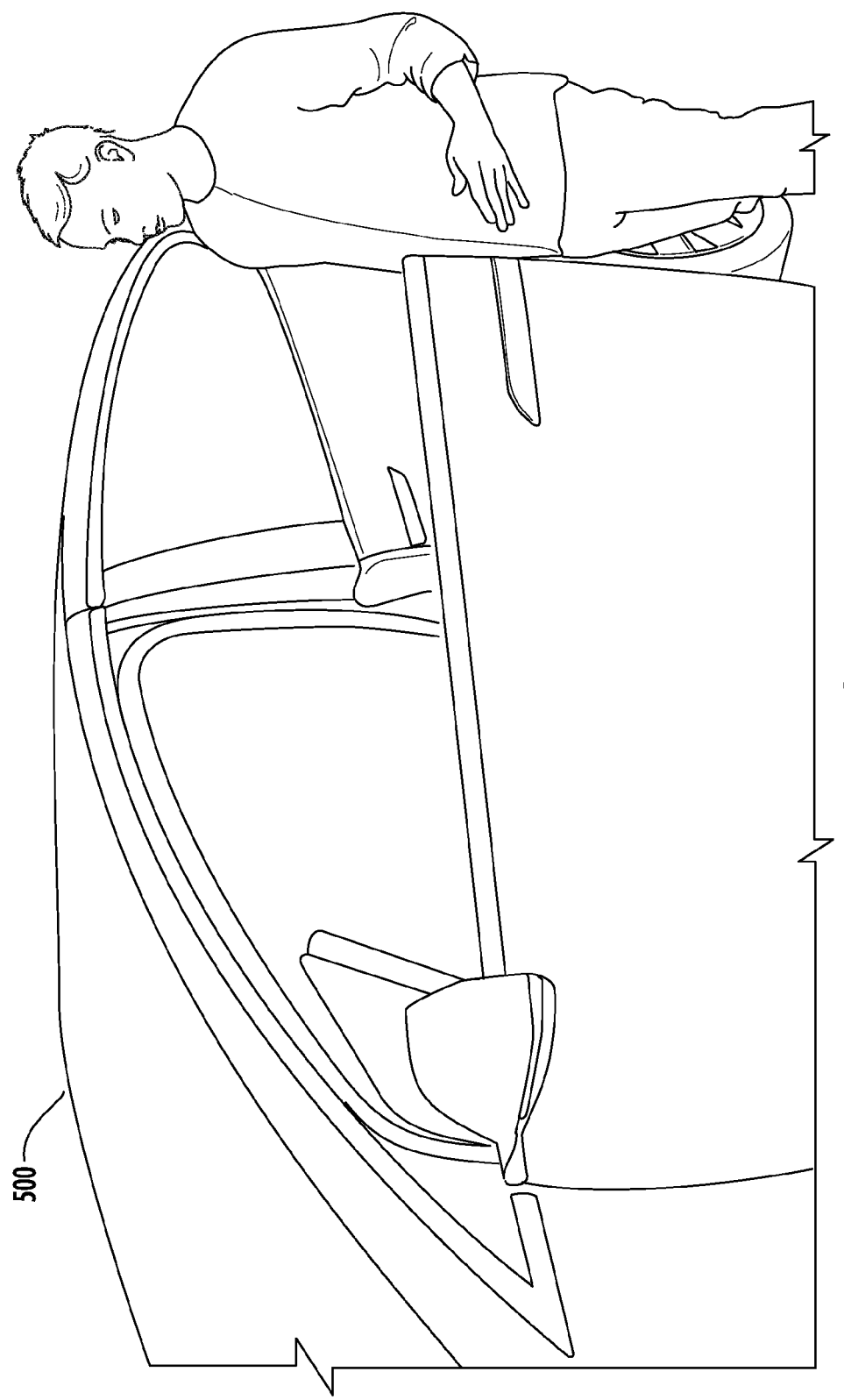
FIG. 6 shows the front door being opened to a wide position.

FIG. 6 shows the front door being opened to a wide position. For example, the person moved into a zone immediately behind the partially open door and this triggered the system to further open the door to a wide position, such as the position 202 (FIG. 2).

Figure 7:
FIG. 7 shows an example of the front door having been closed after the person enters the driver seat.

FIG. 7 shows an example of the front door having been closed after the person enters the driver seat. For example, this is triggered by a detection that the key fob is inside the vehicle and that the driver is stepping on the brake pedal. The vehicle may now be essentially ready to drive. For example, the driver can maneuver a selector to place the vehicle in drive or reverse mode and step on an accelerator pedal.

Figure 8:
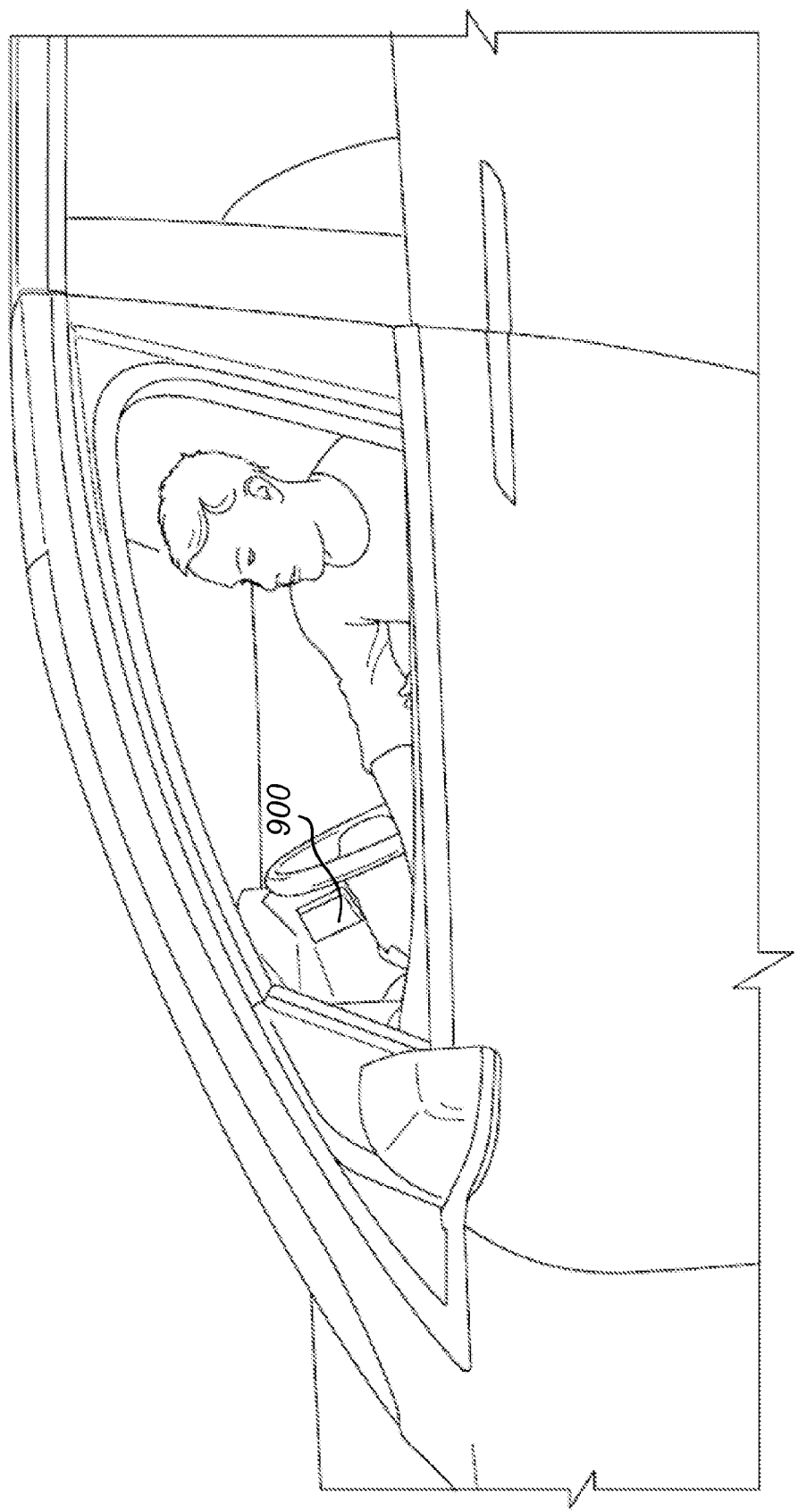
FIG. 8 shows an example of opening the front door from inside the vehicle.

FIG. 8 shows an example of opening the front door from inside the vehicle. For example, the driver here reaches for and actuates an interior door handle. This triggers the automated opening of the door. For example, the door can then open to approximately the convenience position, and from there the driver can push the door open further, assuming that there are no obstructions.

Figure 9:
FIG. 9 shows another example of opening the front door from inside the vehicle.

FIG. 9 shows another example of opening the front door from inside the vehicle 500. Here, the vehicle has a touchscreen 900 that controls various vehicle functions. In particular, instead of operating an interior door handle to open the front door, the driver can activate a control presented on the touchscreen. For example, this control can be presented when the vehicle is placed into park mode. That is, the driver can now exit the vehicle.

A similar functionality can be used for triggering the automated closing of the door while the driver is inside. In some implementations, the touchscreen then presents a control for causing the door to close. For example this control is available when the driver is detected to have entered the driver seat. Also, a control for closing the passenger side front door can be presented.

Other ways of triggering the automated door opening can be used. In some implementations, a detection of driver intent to leave the vehicle can be used as a signal to automatically open the door. For example, if the driver unbuckles his or her seatbelt this triggers the automated door opening.

Figure 10:
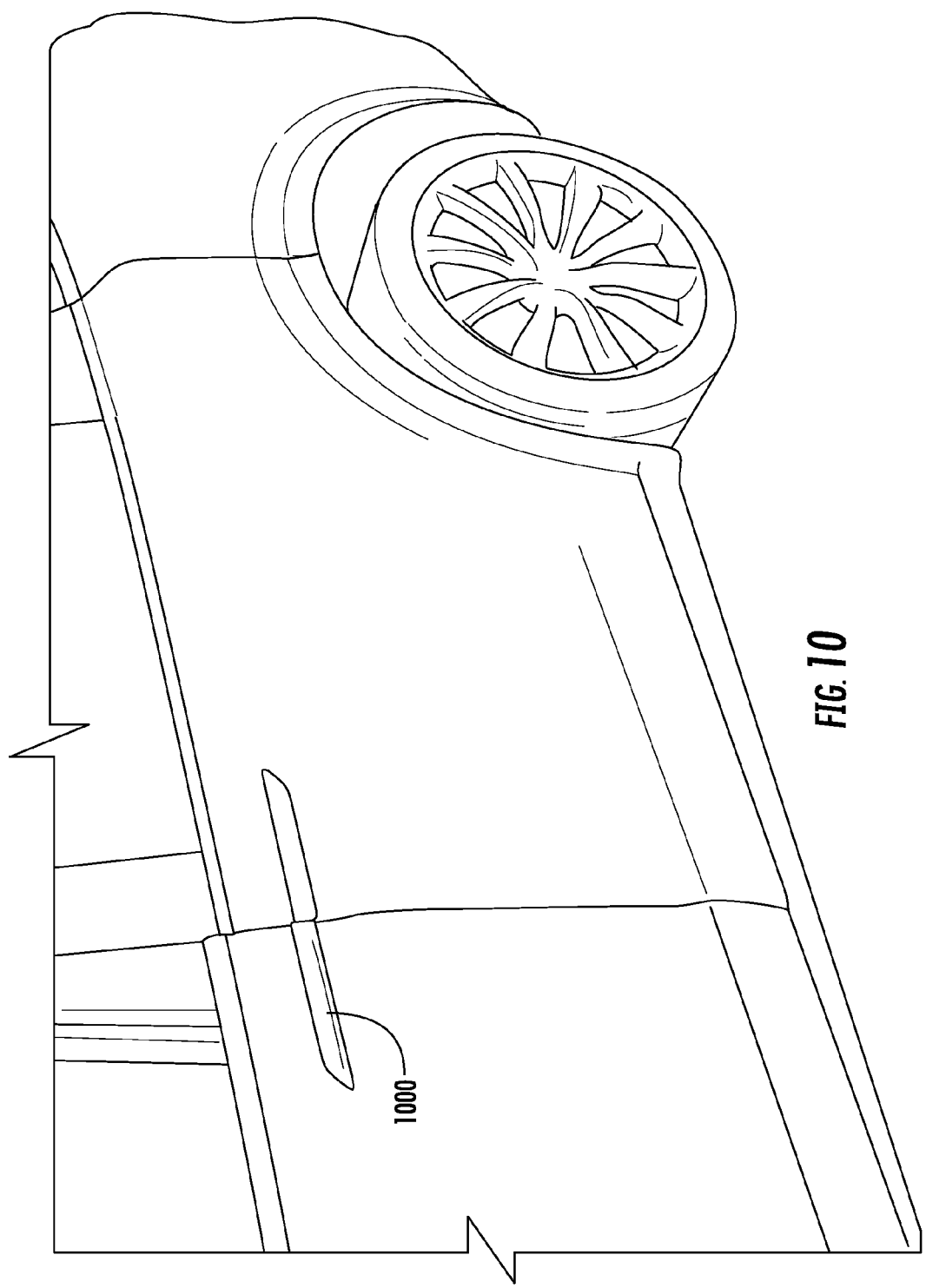
FIG. 10 shows an example of the front door being closed after the person leaves the vehicle.

FIG. 10 shows an example of the front door being closed after the person leaves the vehicle 500. That is, assuming that the person walks away from the vehicle after leaving the driver seat (e.g., as shown in FIG. 8 or 9), then the vehicle may eventually detect that the driver moves beyond a predefined zone, and then automatically close the front door again. In some implementations, the detection is performed using the wireless device. For example, the door can be closed when the driver is no longer in the zone 102 (FIG. 1).

When the doors are closed, the vehicle may continuously be listening for signals from the wireless device. If they are detected, this can then trigger the opening of the front door, for example as shown in FIG. 1. The door can also or instead be opened in other ways. For example, if automatic opening mode is turned off in the vehicle system, then the system may not respond to wireless signals in the way described above. However, the user can manually trigger the automated opening of the door. In some implementations, the driver seat door has a touch control 1000 on the outside. The touch control can be formed like a presenting door handle of the type that sits flush with the door skin when retracted. For example, the touch control does not extend out of the door at all but rather presents a touch sensitive surface (e.g., using capacitive sensing) that detects when a person placed their hand or arm against the control. This can then trigger an automated opening of the door, such as to a convenience position. In some implementations, the manual triggering is only active if the vehicle senses that the wireless device is near the vehicle. The user can push or pull the door beyond the convenience position, and when the user stops moving the door, the system can automatically engage the brake to hold the door in place.

The touch control 1000 can also be used for automatically closing the door when it is open. For example, if the driver touches the touch control while the door is in the convenience position, this will trigger the automated closing of the front door. The touch control can serve to stop the automated movement if touched when the door is in motion. For example, the control on the touchscreen can function similarly.

Figure 11:
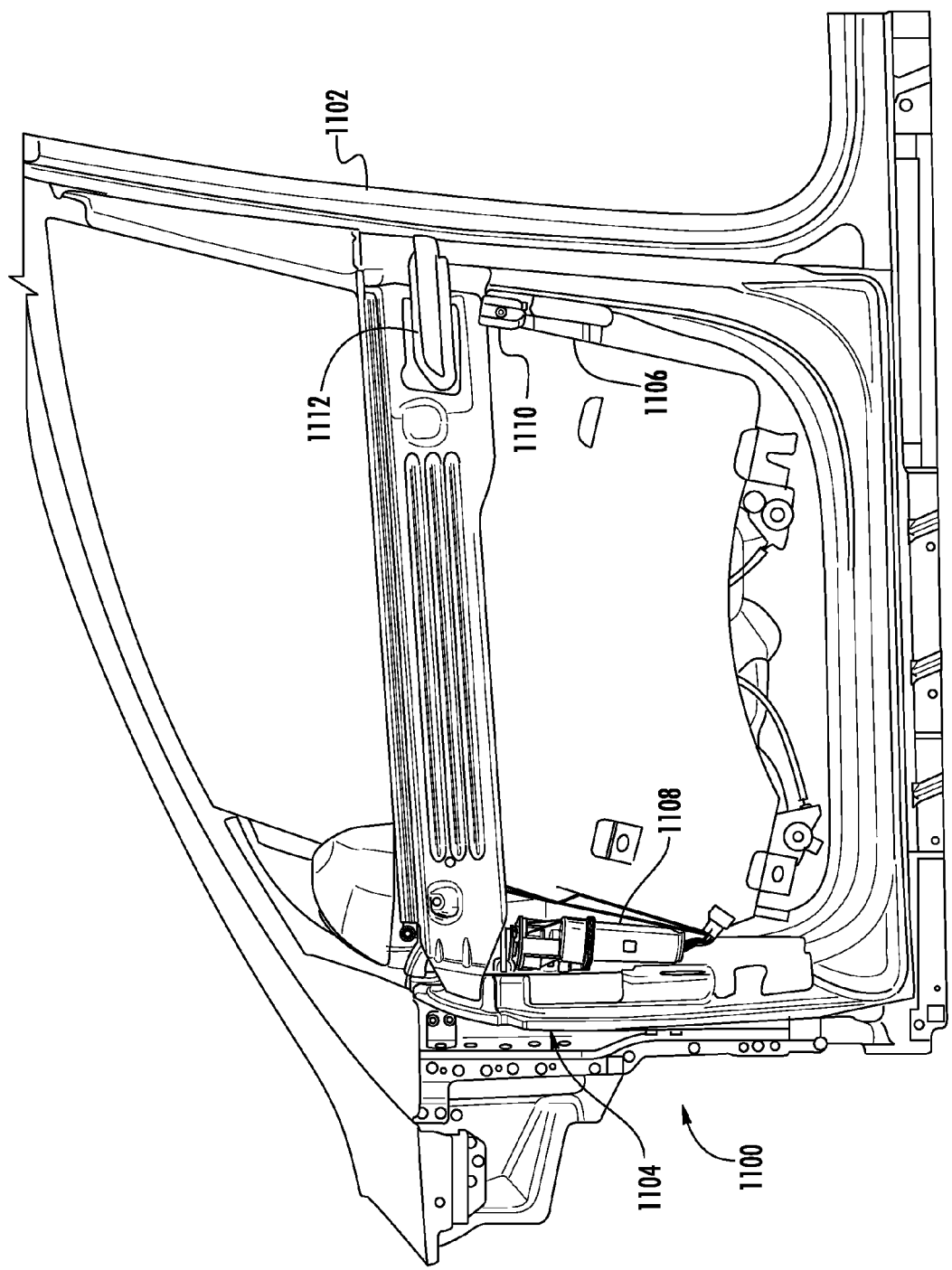
FIG. 11 shows an example of a front door.

FIG. 11 shows an example of a front door 1100. The door is here shown mostly with a door frame on which is mounted power opening and closing equipment, and other components, such as the window regulator and the window glass. That is, a number of door components, such as the outer skin, have here been omitted for clarity.

The door 1100 is mounted onto a vehicle frame 1102. The vehicle frame forms a hinge area 1104 which is where one or more hinges for the door are attached to the frame so as to allow the door to rotate between open and closed positions. The vehicle frame and the door also include a latching arrangement such that the door can selectively be cinched to the body. For example, a latch 1106 can be released whenever the door should move (automatically or manually) out of the closed position.

The door has an electric actuation motor 1108 for opening and closing the door. The motor is attached towards the front of the door frame and actuates at the hinge area. For example, the motor can apply a certain amount of torque in order to move the door. The door also has a push-open actuator 1110 located toward the rear of the door. This actuator can push the door away from the body, for example when the motor cannot generate enough torque to do so. The door has a touch control 1112 that can operate similarly to the touch control 900 (FIG. 9). The latch 1106, the electric actuation motor 1108, the push-open actuator 1110, and the touch control 1112 can be connected to a controller (not shown). For example, this is a processor-based component that takes input from one or more sensors and gives output to any of the components. In doing so, the controller can input sensor values into programmed algorithms to dictate the motion of the door.

Figure 12:
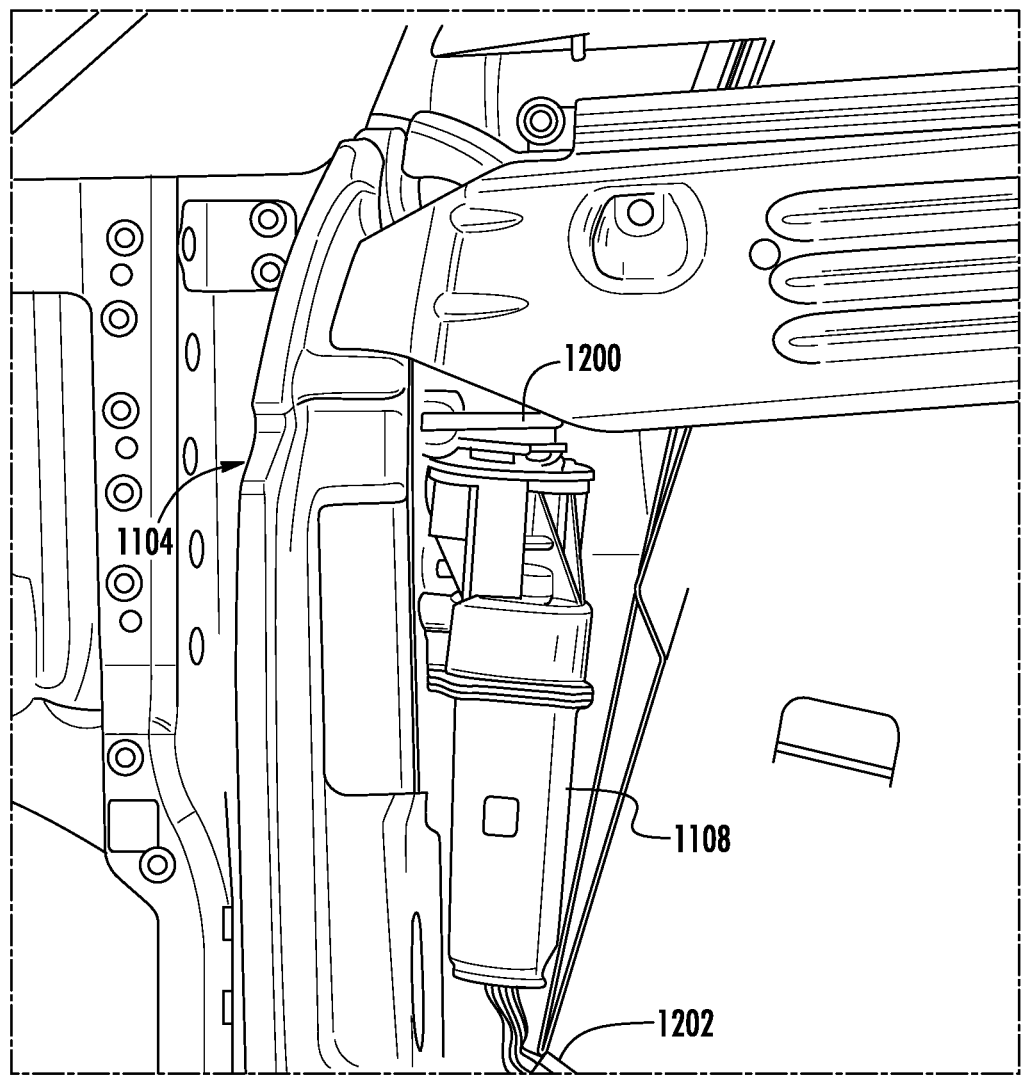
FIG. 12 shows an example of the electric actuating motor actuating at a hinge of the front door.

FIG. 12 shows an example of the electric actuating motor 1108 actuating at a hinge of the front door. More particularly, the motor actuates a linkage 1200 that applies torque at the hinge area 1104 to open or close the door. A harness connector 1202 is used to supply power to the motor so that the controller can operate the motor, such as by pulse width modulation.

Figure 13:
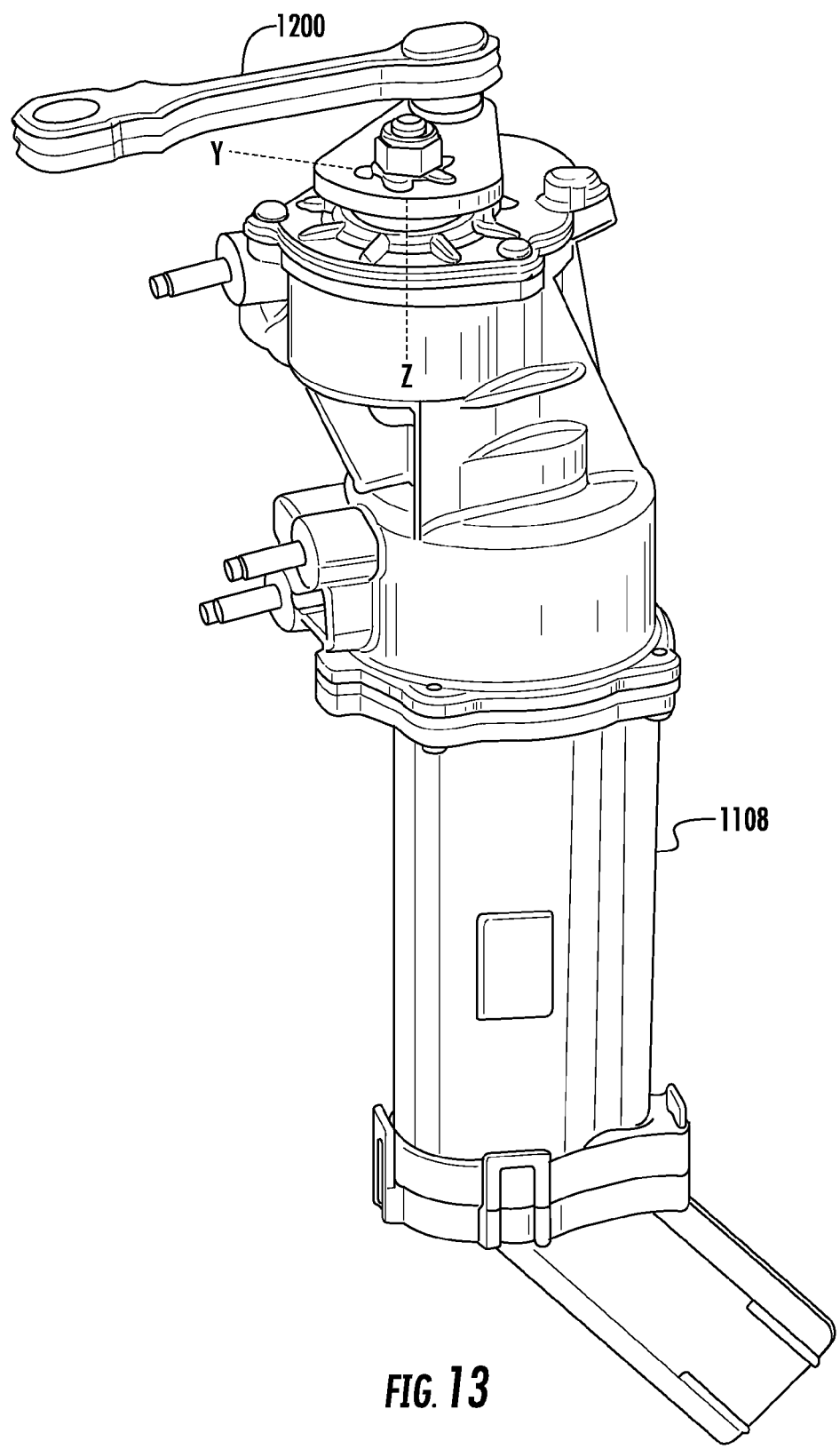
FIG. 13 shows an example of the electric actuating motor.

FIG. 13 shows an example of the electric actuating motor 1108. In some implementations, this is an electric rotary motor that rotates a system of gears that in turn rotate the linkage 1200 to open and close the front door. For example, an integrated electromechanical brake can prevent and slow rotation of the linkage. The linkage can include a ball stud attachment. The body side ball stud attachment can then be part of an upper door hinge assembly. While the motor can have its own brake for the door, a door over-open stop can also be used, for example on the door hinges.

Figure 14:
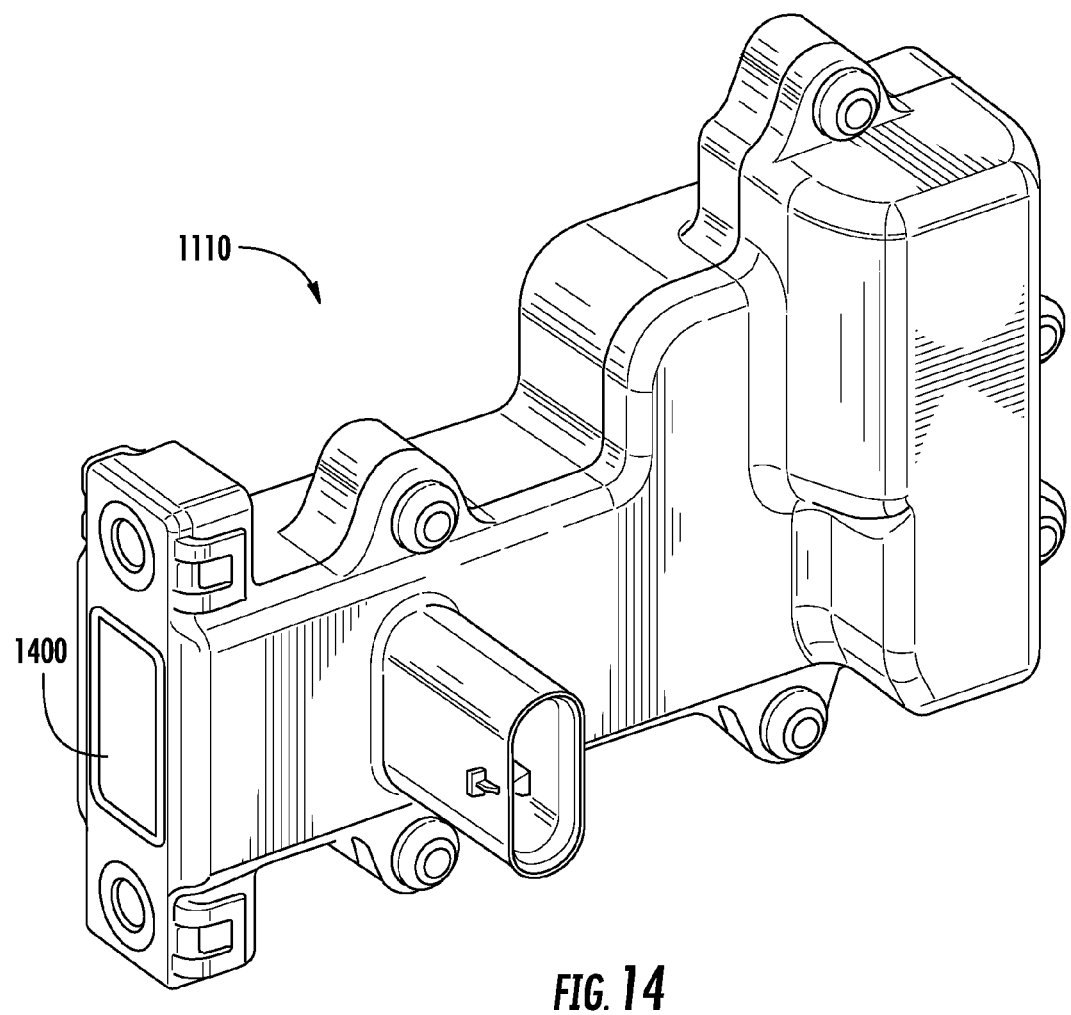
FIG. 14 shows an example of the push-open actuator.

FIG. 14 shows an example of the push-open actuator 1110. In some implementations, the driver and passenger doors will each have a linear push-open actuator located near the rear edge of the door above the cinching latch. Here, an actuator ram 1400 is currently retracted but will be extended from the actuator housing when the actuator is activated. This actuator can be intended for use when the electric motor does not provide sufficient torque to move the door from the fully closed position. This can occur in icy conditions when the door is frozen to the body. For example, the controller can detect that the motor is not able to move the door, and in response can activate the actuator.

The actuator is attached to the door inner panel and pushes against the body, such as the B-pillar. The actuator can include a home switch to prevent door closing while actuator ram is extended. The ram can have a plastic head that pushes against the painted body surface when activated. The force of the actuator can be chosen based on the weight and size of the door and the severity of potential wintry conditions, to name two examples. The actuator can be powered and controlled in any suitable way, such as by pulse width modulation.

A number of implementations have been described as examples. Nevertheless, other implementations are covered by the following claims.

What is claimed is:

1. A vehicle system comprising:
   a door of a vehicle;
   an electric actuating motor configured to open the door of the vehicle;
   a detector configured to detect a wireless device configured for communications with the vehicle; and
   a door controller configured to:
      in response to the detector determining that the wireless device is within a first predefined zone proximate to the door, control the electric actuating motor to open the door to a first angle; and
      in response to the detector determining that the wireless device is within a second predefined zone proximate the door, control the electric actuating motor to open the door to a second angle that is greater than the first angle.

2. The vehicle system of claim 1:
   wherein the door is a front door;
   further comprising a rear door behind the front door; and
   wherein the door controller is further configured to control the electric actuating motor to keep the door at the first angle when the rear door is open.

3. The vehicle system of claim 1:
   wherein the door is a front door;
   further comprising a rear door behind the front door; and
   wherein the door controller is further configured to select the first angle based upon whether the rear door is open.

4. The vehicle system of claim 1, wherein the first predefined zone and the second predefined zone are in differing predefined patterns relative to the door.

5. The vehicle system of claim 1, wherein:
   the detector is further configured to detect obstacles near the door; and
   upon detection of an obstacle near the door by the detector, the door controller is further configured to control the electric actuating motor to preclude opening of the door to the second angle.

6. The vehicle system of claim 1, wherein the wireless device is at least one of:
   a key fob;
   a smartphone;
   a tablet computer;
   a smart watch; or
   a wearable digital device.

7. The vehicle system of claim 1, wherein the door controller is further configured to:
   detect an impeding of opening of the door; and
   control the electric actuating motor to keep the door at an angle of the door when the impeding of opening of the door is detected.

8. The vehicle system of claim 1, wherein the door controller is further configured to control the electric actuating motor to return the door to a closed position when the wireless device does not enter the second predefined zone within a predefined timeout period.

9. The vehicle system of claim 1, wherein:
   the detector is further configured to detect that a driver has entered the vehicle; and
   upon detection of the driver entering the vehicle by the detector, the door controller is further configured to control the electric actuating motor to close the door.

10. The vehicle system of claim 9, wherein the detector is further configured to detect that the driver has entered the vehicle by at least one of:
    detecting that the wireless device is inside the vehicle; or
    detecting a depression of a brake pedal of the vehicle.

11. The vehicle system of claim 1, further comprising a touchscreen inside the vehicle, the touchscreen configured to display a control for closing or opening the door.

12. A vehicle system comprising:
    a door of a vehicle;
    an electric actuating motor configured to open the door of the vehicle;
    a detector configured to detect a wireless device configured for communications with the vehicle; and
    a door controller configured to:
       in response to the detector determining that the wireless device is within a first predefined zone proximate to the door, control the electric actuating motor to open the door to a first angle; and
       in response to the detector determining that the wireless device is outside of the first predefined zone, control the electric actuating motor to close the door.

13. The vehicle system of claim 12, wherein the first predefined zone is a predefined pattern relative to the door.

14. The vehicle system of claim 12, further comprising a touchscreen inside the vehicle, the touchscreen configured to display a control for closing or opening the door.

15. The vehicle system of claim 12, further comprising a push-open actuator mounted at a rear of the door, the push-open actuator configured for pushing against a body of the vehicle.

16. The vehicle system of claim 12, further comprising a touch control on an outside of the door, the touch control configured for activating the electric actuating motor.

17. A method comprising:
    detecting that a wireless device that is configured for communications with a vehicle is within a first predefined zone proximate to a door of the vehicle;
    in response to the detection that the wireless device is within the first predefined zone, controlling an electric actuating motor to open the door to a first angle;
    detecting that the wireless device is no longer within the first predefined zone; and
    in response to the detection that the wireless device is no longer within the first predefined zone, controlling the electric actuating motor to close the door.

18. The method of claim 17, wherein detecting that the wireless device is within the first predefined zone proximate to the door of the vehicle comprises communicating with at least one of:
    a key fob;
    a smartphone;
    a tablet computer;
    a smart watch; or
    a wearable digital device.

19. The method of claim 17, further comprising:
    detecting an impeding of opening of the door; and
    keeping the door at an angle of the door when the impeding of opening of the door is detected.

20. The method of claim 17, further comprising receiving an input generated by pressing on the wireless device, and in response actuating the electric motor to open or close the door.

\* \* \* \* \*